(12) United States Patent
Vassilieva et al.

(10) Patent No.: US 9,768,878 B2
(45) Date of Patent: Sep. 19, 2017

(54) METHODS AND SYSTEMS FOR SUPERCHANNEL POWER PRE-EMPHASIS

(71) Applicant: Fujitsu Limited, Kawasaki-shi, Kanagawa (JP)

(72) Inventors: Olga Vassilieva, Plano, TX (US); Inwoong Kim, Allen, TX (US); Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 59 days.

(21) Appl. No.: 14/714,973

(22) Filed: May 18, 2015

(65) Prior Publication Data

US 2016/0344481 A1 Nov. 24, 2016

(51) Int. Cl.
*H04B 10/564* (2013.01)
*H04B 10/08* (2006.01)
*H04B 10/12* (2006.01)
*H04J 14/02* (2006.01)

(52) U.S. Cl.
CPC ........ *H04B 10/564* (2013.01); *H04J 14/0221* (2013.01)

(58) Field of Classification Search
None
See application file for complete search history.

(56) References Cited

U.S. PATENT DOCUMENTS

| | | | | |
|---|---|---|---|---|
| 2002/0181061 A1* | 12/2002 | Uda | ................... | H04J 14/0221 398/141 |
| 2003/0058955 A1* | 3/2003 | Raghavan | ........... | H04L 27/2601 375/265 |
| 2004/0091263 A1* | 5/2004 | Sakamoto | ............ | H04B 10/294 398/45 |
| 2006/0093362 A1* | 5/2006 | Welch | ................ | G02B 6/12004 398/87 |
| 2008/0260016 A1* | 10/2008 | Lapointe | .................. | H04B 3/04 375/233 |
| 2008/0267631 A1* | 10/2008 | Collings | ............. | H04J 14/0205 398/97 |
| 2008/0316937 A1* | 12/2008 | Shi | ........................... | H04B 3/32 370/252 |
| 2009/0317076 A1* | 12/2009 | Shimizu | ..................... | G01J 3/02 398/25 |
| 2012/0269506 A1* | 10/2012 | Vassilieva | ........... | H04J 14/0221 398/26 |
| 2013/0322877 A1* | 12/2013 | Geyer | ............. | H04B 10/07957 398/38 |
| 2014/0314416 A1* | 10/2014 | Vassilieva | ................ | H04B 3/32 398/76 |
| 2016/0192042 A1* | 6/2016 | Mitchell | ............ | H04Q 11/0005 398/48 |

* cited by examiner

*Primary Examiner* — Oommen Jacob

(74) *Attorney, Agent, or Firm* — Baker Botts L.L.P.

(57) ABSTRACT

Methods and systems for superchannel power pre-emphasis may adjust power levels of selected subcarriers of the superchannel. The power pre-emphasis may be performed at a transmission stage using a laser source, a variable optical attenuator, or a wavelength selective switch. The power pre-emphasis may be performed in-line at a reconfigurable optical add-drop multiplexer node. The power pre-emphasis may be performed using feedback control based on a receiver output. The power pre-emphasis may be performed using feedforward control based on optical path computations.

20 Claims, 7 Drawing Sheets

METHODS AND SYSTEMS FOR
SUPERCHANNEL POWER PRE-EMPHASIS

BACKGROUND

Field of the Disclosure

The present disclosure relates generally to optical communication networks and, more particularly, to methods and systems for superchannel power pre-emphasis.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Optical superchannels are an emerging solution for transmission of signals at 400 Gb/s and 1 Tb/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency.

SUMMARY

In one aspect, a disclosed method is for power pre-emphasis for subcarriers of a superchannel. The method may include determining network parameters associated with an optical signal transmission path for transmission of a superchannel. The superchannel may include a plurality of subcarrier bands. The network parameters may include fiber parameters, spectral assignment of the subcarrier bands, and a number of the subcarrier bands. The method may further include determining, for the subcarrier bands respectively, a plurality of power pre-emphasis values, the power pre-emphasis values resulting in an equalized optical signal-to-noise ratio for the subcarrier bands when the superchannel is transmitted over the optical signal transmission path. The method may also include attenuating a power level for at least one of the subcarrier bands according to the power pre-emphasis values. In the method, at least two subcarrier bands may have different power pre-emphasis values.

In any of the disclosed embodiments of the method, attenuating the power level may include controlling a variable optical attenuator associated with an optical transmitter for a subcarrier band. In the method, the variable optical attenuator may output an optical signal to a wavelength selective switch.

In any of the disclosed embodiments of the method, attenuating the power level may include controlling a laser source included with an optical transmitter for a subcarrier band. In the method, the optical transmitter may output an optical signal to a wavelength selective switch.

In any of the disclosed embodiments of the method, attenuating the power level may include sending an indication to a wavelength selective switch of a first power pre-emphasis value corresponding to a first subcarrier band. In the method, the wavelength selective switch may be included in a reconfigurable optical add-drop multiplexer node in the optical signal transmission path. In the method, the first subcarrier band may be added to the superchannel at the reconfigurable optical add-drop multiplexer node. In the method, the reconfigurable optical add-drop multiplexer node may drop a second subcarrier band from the superchannel.

In any of the disclosed embodiments, the method may include, subsequent to attenuating the power level, amplifying the power levels for each of the subcarrier bands to obtain an average subcarrier power level specified for the superchannel. In the method, relative power levels may be preserved during the amplifying among the subcarrier bands according to the power pre-emphasis values.

In any of the disclosed embodiments, the method may include monitoring power levels of the subcarrier bands in the superchannel. In the method, the attenuating the power level may be based on the power levels monitored.

In another aspect, a disclosed optical transport network is enabled for power pre-emphasis for subcarriers of a superchannel. The optical transport network may include a control plane system including a processor configured to access non-transitory computer readable memory media. In the optical transport network, the memory media store processor-executable instructions. The instructions may be executable by the processor to determine network parameters associated with an optical signal transmission path for transmission of the superchannel. In the optical transport network, the superchannel may include a plurality of subcarrier bands, and the network parameters may include fiber parameters, spectral assignment the subcarrier bands, and a number of the subcarrier bands. In the optical transport network, the instructions may further be executable to determine, for the subcarrier bands respectively, a plurality of power pre-emphasis values, the power pre-emphasis values resulting in an equalized optical signal-to-noise ratio for the subcarrier bands when the superchannel is transmitted over the optical signal transmission path. In the optical transport network, the instructions may also be executable to send a first command to at least one node in the optical transport network to attenuate a power level for at least one of the subcarrier bands according to the power pre-emphasis values. In the optical transport network, at least two subcarrier bands may have different power pre-emphasis values.

In any of the disclosed embodiments of the optical transport network, the instructions to send the first command may include instructions to send the first command to a variable optical attenuator associated with an optical transmitter for a subcarrier band. In the optical transport network, the variable optical attenuator may output an optical signal to a wavelength selective switch.

In any of the disclosed embodiments of the optical transport network, the instructions to send the first command may include instructions to send the first command to a laser source included with an optical transmitter for a subcarrier band. In the optical transport network, the optical transmitter may output an optical signal to a wavelength selective switch.

In any of the disclosed embodiments of the optical transport network, the instructions to send the first command may include instructions to send an indication to a wavelength selective switch of a first power pre-emphasis value for a first subcarrier band. In the optical transport network, the wavelength selective switch may be included in a reconfigurable optical add-drop multiplexer node in the optical signal transmission path. In the optical transport network, the first subcarrier band may be added to the superchannel at the reconfigurable optical add-drop multiplexer node. In the optical transport network, the reconfigurable optical add-drop multiplexer node may drop a second subcarrier band from the superchannel.

In any of the disclosed embodiments of the optical transport network, the memory media may include instructions to, subsequent to executing the instructions to attenuate the power level, send a second command to at least one in-line amplifier to amplify the power levels for each of the subcarrier bands to obtain an average subcarrier power level specified for the superchannel. In the optical transport network, the relative power levels may be preserved among the subcarrier bands according to the power pre-emphasis values.

In any of the disclosed embodiments, the optical transport network may include a power monitor to monitor power levels of the subcarrier bands in the superchannel. In the optical transport network, the instructions to attenuate the power level may be based on the power levels monitored by the power monitor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

Figure 1:
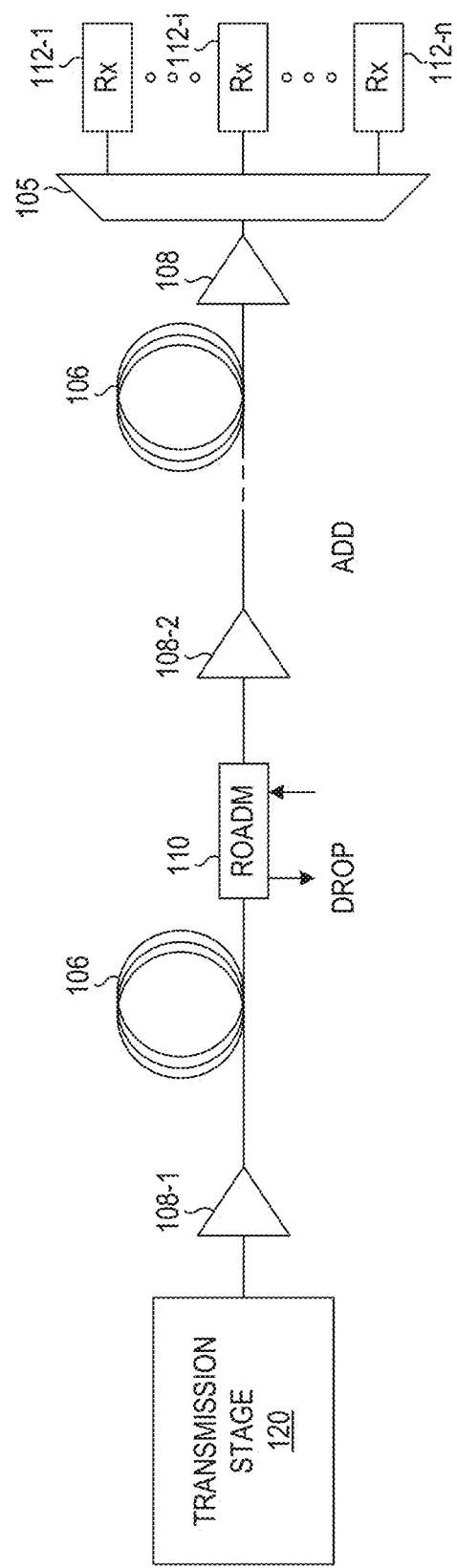
FIG. 1 is a block diagram of selected elements of an embodiment of an optical transport network for superchannel power pre-emphasis.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Turning now to the drawings, FIG. 1 illustrates an example embodiment of optical transport network (OTN) 101. As shown, optical transport network 101 includes one or more optical fibers 106 to transport one or more optical signals communicated by components of optical transport network 101. The network nodes of optical transport network 101, coupled together by fibers 106, may comprise transmission stage 120, one or more amplifiers 108, one or more reconfigurable optical add/drop multiplexers (ROADM) 110, and one or more receivers 112.

Optical transport network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise any suitable type of fiber, such as a Single-Mode Fiber (SMF), Enhanced Large Effective Area Fiber (ELEAF), or a TrueWave® Reduced Slope (TW-RS) fiber.

Optical transport network 101 may include devices to transmit optical signals over fibers 106. Information may be transmitted and received through optical transport network 101 by modulation of one or more wavelengths of light to encode the information on the wavelength. In optical networking, a wavelength of light may also be referred to as a channel. Each channel may carry a certain amount of information through optical transport network 101.

To increase the information carrying capabilities of optical transport network 101, multiple signals transmitted at multiple channels may be combined into a single optical signal, which is referred to herein as a "multi-carrier" optical signal, while the individual channels included in a multi-carrier optical signal are referred to herein as "subcarriers". The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical transport networks may be limited to the bit-rate of one wavelength. With more bandwidth, optical transport networks are capable of transmitting greater amounts of information. Optical transport network 101 may transmit disparate channels using WDM, DWDM, or some other suitable multi-carrier multiplexing technique, and to amplify the multi-carrier signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s or higher. Thus, in a superchannel, subcarriers are tightly packed and consume less optical spectrum than conventional DWDM. Another distinctive feature of superchannels is that the subcarriers in a superchannel travel from the same origin to the same destination, and are not added or removed using a conventional OADM while in transmission, but instead, may be added and dropped using a wavelength selective switch (WSS), such as included in a ROADM node. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the Baud rate (see also FIG. 2).

Optical transport network 101 includes transmission stage 120, which is also described in further detail with respect to FIGS. 4A, 4B, and 4C below. Transmission stage 120 may include one or more optical transmitters (Tx) to transmit optical signals through optical network 101 in specific wavelengths or channels. The transmitters may comprise any system, apparatus or device enabled to convert an electrical signal into an optical signal and to transmit the optical signal. For example, the transmitters may each comprise a laser and a modulator to receive electrical signals, to modulate the information contained in the electrical signals onto a beam of light produced by the laser at a particular wavelength, and to transmit the beam carrying the signal throughout the network. Furthermore, in some embodiments, transmission stage 120 may include respective variable optical attenuators (VOA) that receive an optical signal from a transmitter and that may enable power adjustment for an individual channel or an individual subcarrier in the case of a superchannel. Furthermore, transmission stage 120 may include a multiplexer that is coupled to the transmitters. The multiplexer may be any system, apparatus, or device to combine the signals transmitted by the transmitters, respectively in individual wavelengths, into a single WDM, DWDM, or superchannel signal. In some embodiments, transmission stage 120 may include a wavelength selective switch (WSS), such as included in ROADM node 110, to add the respective wavelengths together to form the superchannel.

Amplifiers 108 may amplify the multi-channeled signals within optical transport network 101. Amplifiers 108 may be positioned before and after certain lengths of fiber 106, which is referred to as "in-line amplification". Amplifiers 108 may comprise any system, apparatus, or device to amplify signals. For example, amplifiers 108 may comprise an optical repeater that amplifies the optical signal. This amplification may be performed with opto-electrical or electro-optical conversion. In some embodiments, amplifiers 108 may comprise an optical fiber doped with a rare-earth element. When a signal passes through the fiber, external energy in the form of a pump signal may be applied to excite the atoms of the doped portion of the optical fiber, which increases the intensity of the optical signal. As an example, amplifiers 108 may comprise an erbium-doped fiber amplifier (EDFA). However, any other suitable amplifier, such as a semiconductor optical amplifier (SOA), may be used.

ROADMs 110 may also be coupled to optical transport network 101 via fibers 106. ROADMs 110 comprise an add/drop module, which may include any system, apparatus or device to add or drop optical signals from fibers 106. After passing through an ROADM 110, a signal may travel along fibers 106 directly to a destination, or the signal may be passed through one or more additional ROADMs 110 before reaching a destination. In this manner, ROADMs 110 may enable connection of different optical transport network topologies together, such as different rings and different linear spans.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

Optical transport network 101 may also include one or more demultiplexers 105 at one or more destinations of network 101. Demultiplexer 105 may comprise any system apparatus or device that may act as a demultiplexer by splitting a single WDM signal into its individual channels. For example, when optical transport network 101 transmits a forty channel DWDM signal, demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

Optical transport network 101 may also include receivers (Rx) 112 coupled to demultiplexer 105. Each receiver 112 may receive signals transmitted in a particular wavelength or channel, and may process the signals to obtain the information encoded or modulated onto the signal. Accordingly, network 101 may include at least one receiver 112 for every channel of the network. As shown, receiver 112-1 corresponds to a first channel or a first subcarrier, receiver 112-$i$ represents any intermediate channel or subcarrier, while receiver 112-$n$ corresponds to an nth channel or an nth subcarrier where optical transport network 101 transmits n channels or n subcarriers in a superchannel.

Optical networks, such as optical transport network 101, may further employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). In PSK, the information carried by the optical signal may be conveyed by modulating the phase of a reference signal, also known as a carrier wave, or simple, a carrier. The information may be conveyed by modulating the phase of the signal itself using differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Modifications, additions or omissions may be made to optical transport network 101 without departing from the scope of the disclosure. For example, optical transport network 101 may include more or fewer elements than those depicted. Additionally optical transport network 101 may include additional elements not expressly shown, such as a dispersion compensation module. Also, as mentioned above, although depicted as a point to point network, optical transport network 101 may comprise any suitable network for transmitting optical signals such as a ring or mesh network.

In operation, optical transport network 101 may be used to transmit a superchannel, in which a plurality of subcarrier signals are densely packed in a fixed bandwidth band and may be transmitted at very high data rates, such as 400 Gb/s, 1 Tb/s, or higher. Furthermore, a superchannel may be well suited for transmission over very long distances, such as hundreds of kilometers, for example. A typical superchannel may comprise a set of subcarriers that are frequency multiplexed to form a single channel and which are transmitted through the entire network as one entity. The subcarriers within the superchannel may be tightly packed to achieve high spectral efficiency. In order to minimize linear crosstalk between neighboring subcarriers in the superchannel, Nyquist filtering may be applied at the transmitter side to shape the subcarrier frequency bands (see also FIG. 2).

It has been reported that subcarriers in a superchannel may exhibit different degrees of bit rate error (BER), and accordingly OSNR, which may be observed at receivers 112. For example, subcarriers in a central band of the superchannel may suffer from larger BER due to non-linear interaction compared to subcarriers in an edge band of the superchannel. Such a variance in BER among the subcarriers of a superchannel may be undesirable for an operator of optical transport network 101. The operator (or network service provider) of optical transport network 101 may desire uniform performance for every transmitted channel for operational and economic reasons. As will be described in further detail herein, optical transport network 101 may implement variable subcarrier power levels to reduce or eliminate an OSNR variance among subcarriers of a superchannel.

As noted above, optical superchannels may represent a promising solution for transmission of signals at 400 Gb/s and 1 Tb/s data rate per channel. Various transmission experiments with superchannels have revealed that each subcarrier within a superchannel may experience different amounts of linear and non-linear interactions with neighboring subcarriers, resulting in different received OSNR penalties. For example, an intermediate band of the superchannel may suffer from larger non-linear interaction compared to subcarriers in an edge band of the superchannel. In order to compensate for such effects, a variable subcarrier power level adjustment method, referred to herein as "power pre-emphasis", may lower transmitted power levels for certain intermediate subcarriers bands. In other words, certain intermediate subcarrier bands may be attenuated to transmit at a lower power levels with the superchannel. Because OSNR is proportional to fiber input power, reduction of power may slightly reduce OSNR for an individual subcarrier. However, the power level reduction of an intermediate subcarrier in a superchannel may also reduce inter-subcarrier non-linear interactions that result in OSNR degradation in neighboring subcarriers. In this manner, slightly lower OSNR may be intentionally induced on certain subcarriers in the superchannel band, while non-linear crosstalk effects may be significantly reduced. Such power pre-emphasis may result in overall reduced OSNR degradation, when viewed across all subcarriers in the superchannel, and may further equalize OSNR penalties for all subcarriers.

Accordingly, in operation of optical transport network 101 with power pre-emphasis, a transmitted power level of certain subcarriers (i.e., the subcarrier frequency bands) within the fixed bandwidth superchannel may be adjusted at transmission stage 120 to optimize a combination of linear and non-linear interactions that are responsible for OSNR penalties during transmission, resulting in an overall improvement in both OSNR and OSNR uniformity among the subcarriers. After power pre-emphasis, in which the adjustment is typically attenuation of power levels for one or more pairs of subcarriers, the power levels for each of the subcarrier bands may be amplified, for example by amplifier 108, to obtain an average subcarrier power level specified for the superchannel, such that relative power levels are preserved among the subcarrier bands according to power pre-emphasis values. Furthermore, as one or more subcarriers are added or dropped at ROADM nodes 110, power pre-emphasis may be performed for each of the one or more added subcarriers to match specified power pre-emphasis values that were previously applied to any dropped subcarriers (in case of replacement of subcarriers) or to match specified power pre-emphasis for the resulting superchannel when new subcarriers are added.

Figure 2:
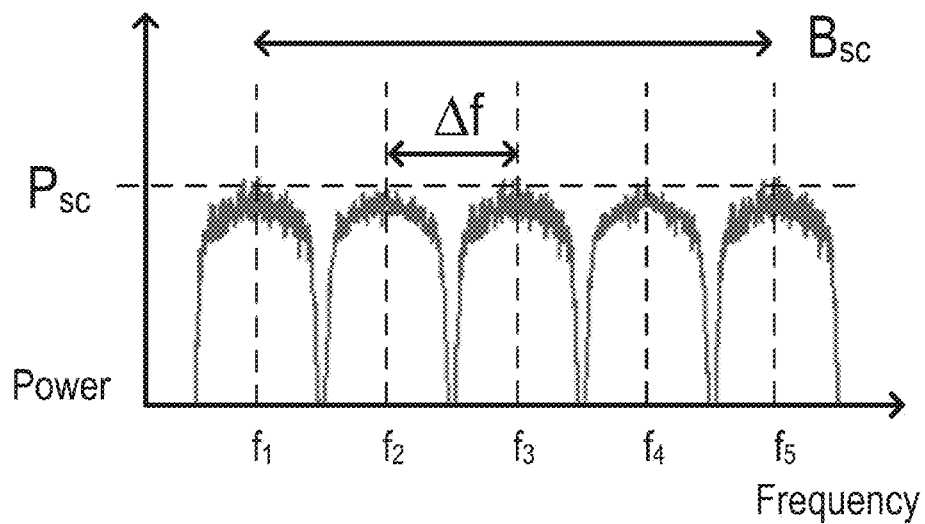
FIG. 2 shows selected elements of an embodiment of a superchannel power spectrum.

Referring to FIG. 2, selected elements of an embodiment of a superchannel is shown as superchannel power spectrum 200, which depicts five (5) subcarriers. While the data used for superchannel power spectrum 200 are not actual measured values, the illustrated power spectrum may be characteristic of an actual superchannel. In superchannel power spectrum 200, the subcarriers may each be modulated with 200 GB/s DP-16-QAM signals. Furthermore, each subcarrier band has been subject to electrical Nyquist pulse shaping in the transmitter using a root raised cosine method using a roll-off factor of 0.15. As shown in FIG. 2, $B_{SC}$ represents the fixed superchannel transmission band, while $\Delta f$ represents the subcarrier frequency spacing. In certain embodiments, the subcarrier frequency spacing $\Delta f$ may be 35 GHz and may be uniform between each center frequency $f_1$, $f_2$, $f_3$, $f_4$, and $f_5$, respectively corresponding to the subcarrier bands. The subcarrier frequency spacing Δf may be selected to be wide enough to prevent any significant linear crosstalk between adjacent subcarriers. The optical signal of each subcarrier may be multiplexed using an optical coupler to form the single superchannel in the fixed transmission band $B_{SC}$ having an aggregate data rate of 1 Tb/s, for example. It is noted that different values for the fixed superchannel transmission band, $B_{SC}$, the subcarrier frequency spacing Δf, and the overall aggregate data rate may result in superchannel power spectrum 200. Also shown in FIG. 2 is constant power level, $P_{SC}$, that is a power level for the superchannel that is substantially similar or equal for each of the 5 subcarrier bands, such that $P_{SC}$, may correspond to an average power level for each of the subcarrier bands.

In typical DWDM networks, it is known that system performance may depend on an allocation of each wavelength channel on the wavelength grid, such that a longer wavelength channel may suffer from smaller non-linear impairments compared to a shorter wavelength channel. In case of superchannel-based WDM systems, in addition to the wavelength dependency of the subcarrier error rate across the transmission band, $B_{SC}$, a dependency of individual subcarrier error rate (or OSNR at the receiver) on spectral allocation of the subcarrier within the superchannel has now been observed in the form of non-linear impairments (such as cross-talk). Linear cross-talk may be observed between two adjacent subcarrier bands (inter-subcarrier) and may depend on a degree or extent of overlap in the frequency domain of the adjacent subcarrier bands. The use of Nyquist pulse shaping, as shown in FIG. 2, may represent an effective means for maintaining a minimum level of linear cross-talk between adjacent subcarriers, at least in part due to the nearly vertical edges of the Nyquist-shaped subcarrier bands (spectral pulses) that do not substantially overlap each other in the frequency domain. Non-linear cross-talk may also be observed and may arise from non-linear interactions during fiber transmission. The non-linear interactions may include phenomena such as cross-phase modulation (XPM), self-phase modulation (SPM), and four-wave mixing, among others. Cross-phase modulation may occur when phase information, amplitude information, or both from one channel is modulated to an adjacent channel in the superchannel. Self-phase modulation may arise when a variation in the refractive index (or a dependency of the refractive index on intensity) results in a phase shift within each subcarrier. In four-wave mixing, three wavelengths may interact to create a fourth wavelength that may coincide with a wavelength of a subcarrier, and may lead to undesirable variations in peak power or other types of signal distortion on the affected subcarrier. Furthermore, non-linear cross-talk may comprise inter-subcarrier components. Since non-linear interactions occur during fiber transmission and may not depend on a degree of overlap of the subcarrier frequency bands, Nyquist pulse shaping may be ineffective in resolving problems with non-linear cross-talk in a superchannel. As will be described in further detail herein, at least some of the subcarrier bands depicted in simulated frequency spectrum 200 may be adjusted with lower power levels, compared to $P_{SC}$, to reduce the variation in OSNR between the individual subcarrier bands.

Figure 3:
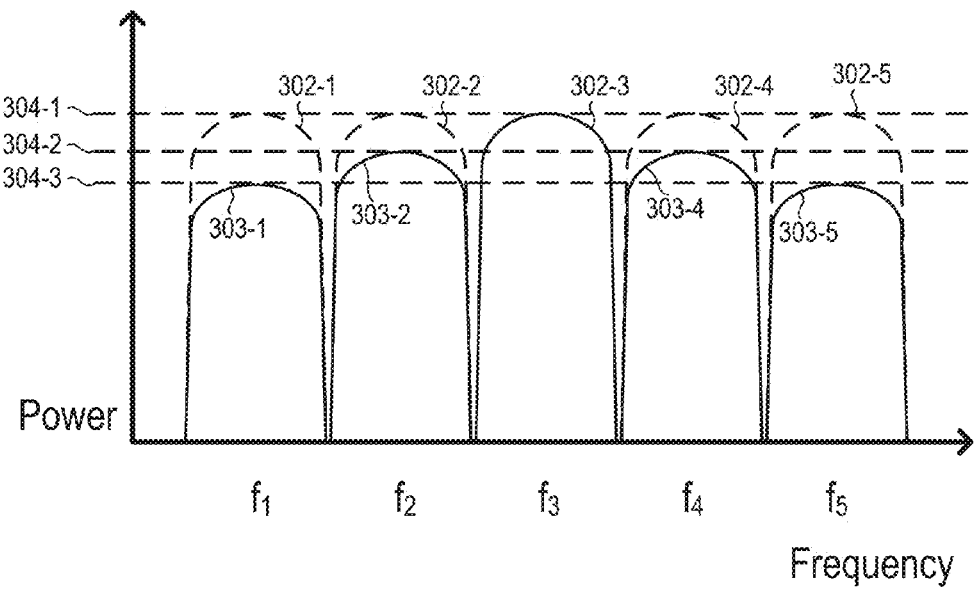
FIG. 3 shows selected elements of an embodiment of a superchannel power spectrum with power pre-emphasis.

Referring to FIG. 3, selected elements of an embodiment of a superchannel is shown as superchannel power spectrum 300, which depicts five (5) subcarriers 302. As shown in FIG. 3, subcarriers 302 are depicted in simplified form for descriptive clarity, yet may still correspond to the subcarrier bands depicted in superchannel power spectrum 200 (see FIG. 2). In superchannel power spectrum 300, subcarrier bands 302-1 and 302-5 are designated as "edge bands" or "edge subcarriers" or "edge subcarrier bands" in reference to their edge positions within the superchannel subcarrier bands, and may define an overall fixed bandwidth of the superchannel. In the arrangement shown in FIG. 3 with 5 subcarrier bands (an odd number of subcarrier bands), subcarrier band 302-3 is designated a center subcarrier band, such that the frequency $f_3$ of subcarrier band 302-3 is given by the average value of frequencies $f_1$ and $f_5$. The remaining subcarrier bands 302-2 and 302-4 are termed "intermediate bands" or "intermediate subcarriers" or "intermediate subcarrier bands". According to the methods described herein, power pre-emphasis may be performed on edge subcarrier bands 302-1, 302-5 and intermediate subcarrier bands 302-2, 302-4. Center subcarrier band 302-3, when present in a superchannel having an odd number of subcarriers, may be omitted from the power level adjustment.

Specifically, a first power level adjustment may be performed to edge bands 302-1, 302-5 to result in adjusted edge bands 303-1, 303-5, which may be symmetrically adjusted with respect to center band 302-3 (or a center frequency of the superchannel). Also, a second power level adjustment may be performed to intermediate bands 302-2, 302-4 to result in adjusted intermediate bands 303-2, 303-4, which may also be symmetrically adjusted within the superchannel. As a result of the power level adjustments, non-linear inter-subcarrier impairments to subcarrier bands $f_2$, $f_3$, and $f_4$ may be significantly reduced, while certain OSNR degradation is imposed on subcarrier bands $f_1$, $f_2$, $f_4$ and $f_5$, when all five subcarrier bands are transmitted as a superchannel. The amount of increase of OSNR degradation may be very small compared to the decrease of non-linear cross-talk achieved in this manner. In addition, as a result of the power level adjustments, OSNR penalties induced by other non-linear intra-subcarrier impairments, such as self-phase modulation (SPM), to subcarriers $f_1$, $f_2$, $f_4$ and $f_5$ may be also reduced. Thus, the overall variation of OSNR penalties among all the subcarriers of the superchannel may be reduced.

Power pre-emphasis may be achieved by various methods, as will be described in further detail below. In one embodiment a variable optical attenuator (VOA) is used for power pre-emphasis of each affected subcarrier, for example, immediately prior to combining or multiplexing the subcarrier bands into the superchannel in transmission stage 120 (see also FIG. 4A). In one embodiment, an output power of a laser source for each affected subcarrier is modulated for power pre-emphasis. Assuming that the laser output power can be controlled within a required accuracy, group control of the laser sources, corresponding to symmetric pairs of subcarrier bands, may be implemented. In various embodiments, a wavelength selective switches (WSS) having optical power equalization functionality may be used to selectively attenuate power levels in subcarriers in transmission stage 120 or along the transmission path, such as in a ROADM node 110 (see FIG. 1). A desired power adjustment per subcarrier may be pre-calculated using various parameters and information, such as channel spacing, a number of channels and certain fiber parameters (dispersion parameters, non-linear coefficients, and effective fiber lengths). Such parameters and other information about the optical network may be stored in a database and extracted by path computation engine 702 (PCE), further described below with respect to FIG. 7. Then, instructions may be transmitted to respective optical devices to implement the desired power level per subcarrier. The optical devices receiving instructions to set power pre-emphasis may accordingly include laser sources, VOAs, and WSSs in the optical network.

Although the example spectra of a superchannel depicted in FIGS. 2 and 3 are shown with 5 subcarrier bands, it is noted that the methods described herein for power pre-emphasis may be practiced on superchannels having different numbers of subcarrier bands. For example, when the superchannel has an even number of subcarriers, such as 4, 6, 8, 10, etc., the intermediate bands may comprise all the subcarrier bands except the two edge subcarrier bands, since no center subcarrier band is present. The center band (when present) may be omitted from power pre-emphasis in various superchannel configurations. In some embodiments, such as with superchannels having 4 subcarrier bands, the intermediate bands may not be subject to power pre-emphasis. Also, in instances where a number of subcarrier bands subject to power pre-emphasis, optionally including intermediate subcarrier bands and edge subcarrier bands, is four or more, a magnitude of the power pre-emphasis may depend on a position of a subcarrier band within the superchannel. As noted above, for example, the first power level of edge bands 303-1, 303-5 may be different than the second power level of intermediate bands 303-2, 303-4 when power pre-emphasis is performed.

In FIG. 3, different power levels 304 are shown that are applied during power pre-emphasis. Specifically, power level 304-1 may correspond to the unadjusted power level, $P_{SC}$, as shown in FIG. 2. Power level 304-3 may correspond to a reduced power level of edge bands $f_1$ and $f_5$ after power pre-emphasis is applied, while power level 304-2 may correspond to a reduced power level of intermediate bands $f_2$ and $f_4$ after power pre-emphasis is applied. As is evident in superchannel power spectrum 300, after power pre-emphasis the average power per subcarrier will be lower than $P_{SC}$, which may be undesirable or may not conform to a specified value for the superchannel. Accordingly, after power pre-emphasis, such as using in-line amplifier 108-1 after transmission stage 120 or using in-line amplifier 108-2 after ROADM node 110 (see FIG. 1), the power levels for each of the subcarrier bands may be amplified to obtain an average subcarrier power level specified for the superchannel, such as power level $P_{SC}$. Because the amplification by in-line amplifier 108 will raise power levels for all subcarriers, the relative power levels are preserved among the subcarrier bands according to the power pre-emphasis values.

Figure 4A:
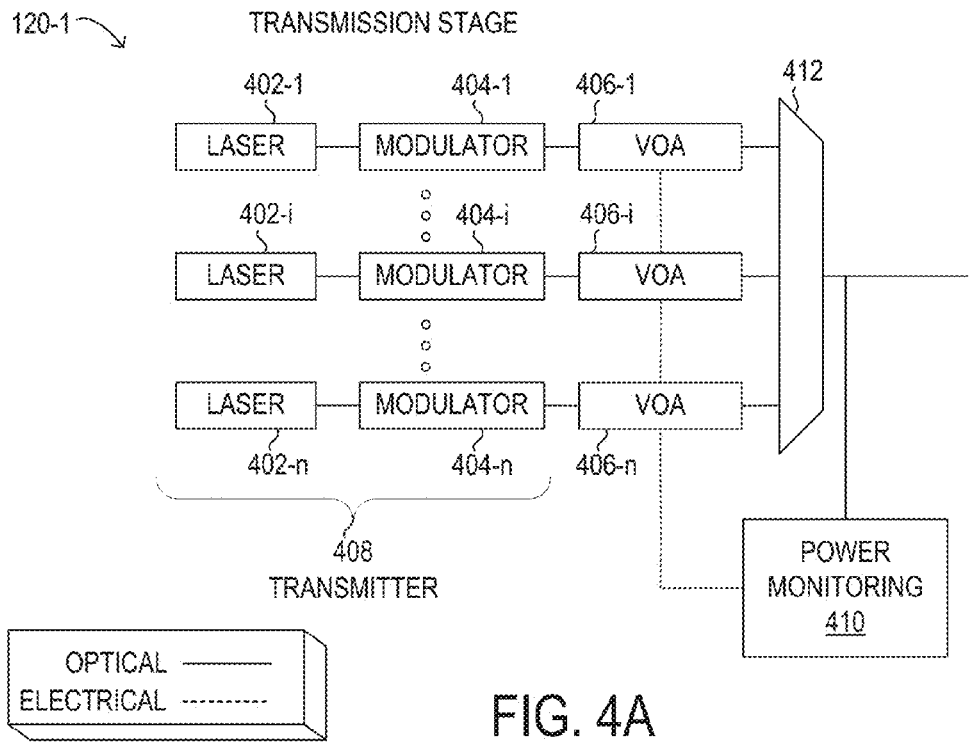
FIGS. 4A, 4B, and 4C are block diagrams of selected elements of embodiments of a transmission stage for superchannel power pre-emphasis.

Referring to FIG. 4A, selected elements of an embodiment of a transmission stage 120-1 is shown in further detail. As shown in FIG. 4A, transmission stage 120-1 includes for each subcarrier (or channel) laser 402 and modulator 404, which may collectively represent a transmitter 408. Also, for each subcarrier a VOA 406 is included prior to multiplexer 412, which combines the outputs from all VOAs 406. As shown, laser 402-1, modulator 404-1, and VOA 406-1 correspond to a first channel or a first subcarrier; laser 402-i, modulator 404-i, and VOA 406-i represent any intermediate channel or subcarrier; and laser 402-n, modulator 404-n, and VOA 406-n correspond to an nth subcarrier where optical transport network 101 transmits n number of subcarriers in a superchannel.

Also included with transmission stage 120-1 is power monitoring 410, which may include functionality to monitor optical power levels for each sub carrier individually from the superchannel after combination by multiplexer 412. In one example of power monitoring, each subcarrier may be modulated with a given tone having a modulation frequency much less than the subcarrier optical frequency. This power-monitoring modulation may be frequency modulation (FM) or amplitude modulation (AM). Then, power monitoring 410 may receive the superchannel and use the modulated tone to detect each individual subcarrier. For example, power monitoring 410 may include a tunable bandpass filter to spectrally scan the superchannel and to perform frequency discrimination at the modulation frequency to detect each subcarrier within the superchannel. The output from the tunable bandpass filter may be received by a photodetector, such as a photodiode. After digitizing the photodetector output signal, the modulation frequency may be detected in the digital domain to result in a spectral shape that is indicative of the received power for each individual subcarrier, as well as a center frequency for each individual subcarrier. Power monitoring 410 may be in communication with optical control plane system 700 (see FIG. 7) to implement feedback control of power pre-emphasis or feedforward control of power pre-emphasis. In feedback control, bit rate error (BER) or quality factor Q may be monitored at receiver 112 and used to regulate desired power pre-emphasis values, taking certain network parameters into account. In feedforward control, path computation engine 702 may calculate desired power pre-emphasis values based on network parameters. Accordingly, power monitoring 410 may be enabled to independently regulate desired power pre-emphasis setpoints, based on monitored power levels. In some embodiments, power monitoring 410 may receive power pre-emphasis setpoints from optical control plane system 700. As shown in FIG. 4A, power monitoring 410 provides control in the form of electrical signals to VOAs 406 to set each subcarrier power pre-emphasis value by attenuation, when applicable.

Figure 4B:
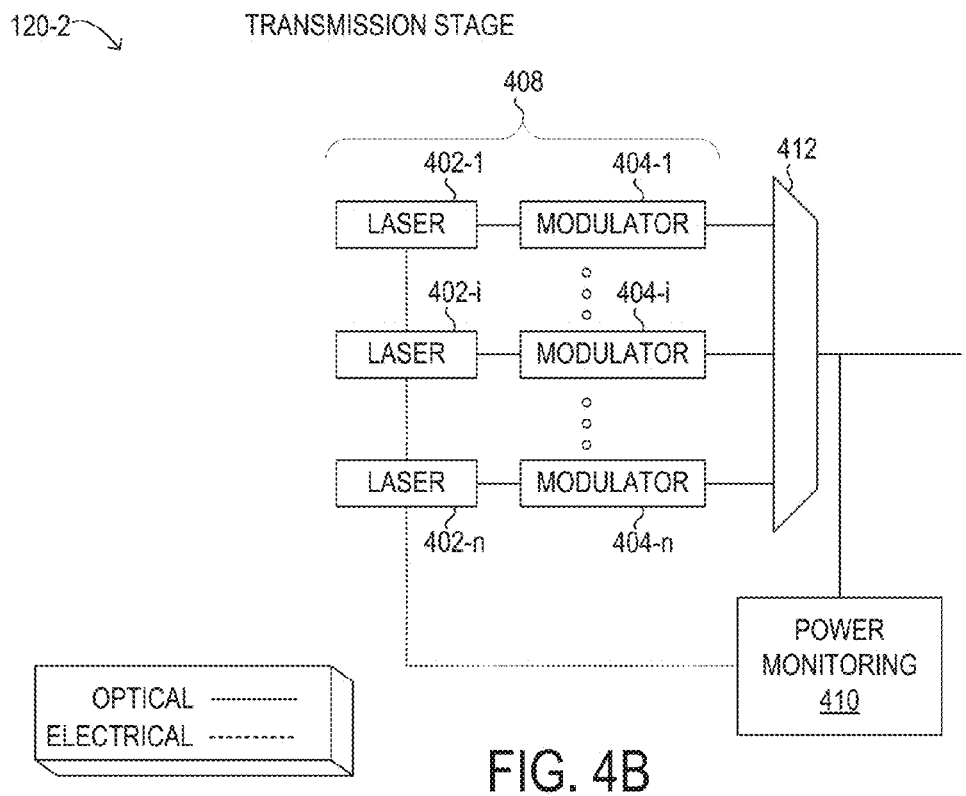

Referring to FIG. 4B, selected elements of an embodiment of a transmission stage 120-2 is shown in further detail. As shown in FIG. 4B, transmission stage 120-2 includes for each subcarrier (or channel) laser 402 and modulator 404, which may collectively represent a transmitter 408, in a substantially similar manner as shown in transmission stage 120-1 in FIG. 4A for n number of subcarriers. Also included with transmission stage 120-2 is power monitoring 410, which may include functionality to monitor optical power levels for each subcarrier individually from the superchannel after combination by multiplexer 412. Power monitoring 410 may be in communication with optical control plane system 700 (see FIG. 7) to implement feedback control of power pre-emphasis or feedforward control of power pre-emphasis. In some embodiments, power monitoring 410 may receive power pre-emphasis setpoints from optical control plane system 700. As shown in FIG. 4B, power monitoring 410 provides control in the form of electrical signals to lasers 402 to set each subcarrier power pre-emphasis value by reduction in laser output power, when applicable.

Figure 4C:
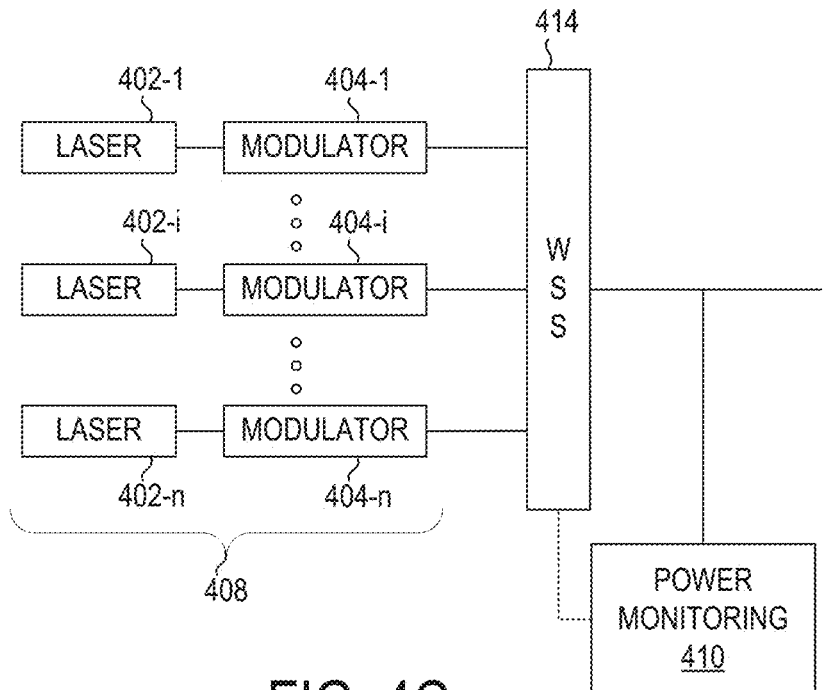

Referring to FIG. 4C, selected elements of an embodiment of a transmission stage 120-3 is shown in further detail. As shown in FIG. 4C, transmission stage 120-3 includes for each subcarrier (or channel) laser 402 and modulator 404, which may collectively represent a transmitter 408, in a substantially similar manner as shown in transmission stage 120-1 in FIG. 4A for n number of subcarriers. Also included with transmission stage 120-3 is power monitoring 410, which may include functionality to monitor optical power levels for each subcarrier individually from the superchannel after combination by WSS 414. Power monitoring 410 may be in communication with optical control plane system 700 (see FIG. 7) to implement feedback control of power pre-emphasis or feedforward control of power pre-emphasis. In some embodiments, power monitoring 410 may receive power pre-emphasis setpoints from optical control plane system 700. As shown in FIG. 4C, power monitoring 410 provides control in the form of electrical signals to WSS 414 to set each subcarrier power pre-emphasis value by attenuation, when applicable.

Figure 5A:
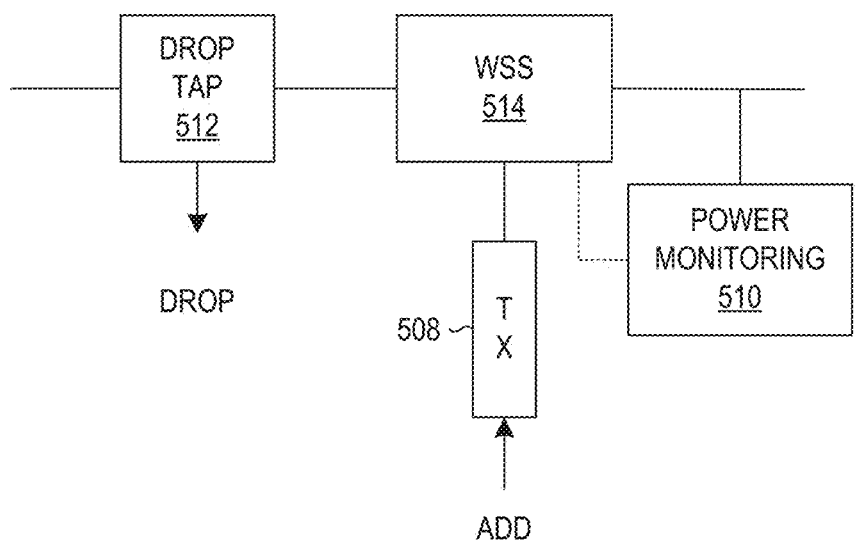
FIGS. 5A, 5B, and 5C are block diagrams of selected elements of embodiments of a reconfigurable optical add-drop multiplexer (ROADM) for superchannel power pre-emphasis.

Referring to FIG. 5A, selected elements of an embodiment of a ROADM node 110-1 is shown in further detail. As shown in FIG. 5A, ROADM node 110-1 includes drop tap 512 for removing dropped subcarriers from the arriving superchannel. Drop tap 512 may remove zero to n number of subcarriers, where the superchannel transmits n number of subcarriers. ROADM node 110-1 also includes WSS 514 for combining added subcarriers to the output superchannel. WSS 514 may add zero to any number of subcarriers to the superchannel. In this manner, ROADM node 110 may enable various topologies and inter-connections of optical networks and optical network segments, as described previously. Also included with ROADM node 110-1 is transmitter 508, which may be substantially similar to transmitter 408 shown in FIGS. 4A-C, for transmitting an added subcarrier. Although transmitter 508 is shown as a singular unit, it will be understood that any number of subcarriers may be added by WSS 514, with each added subcarrier having a respective instance of transmitter 508. Also included with ROADM node 110-1 is power monitoring 510, which may represent substantially similar functionality as power monitoring 410 described in FIGS. 4A-C. As shown in FIG. 5A, power monitoring 510 provides control in the form of electrical signals to WSS 514 to set each added subcarrier power pre-emphasis value by attenuation, when applicable.

Figure 5B:
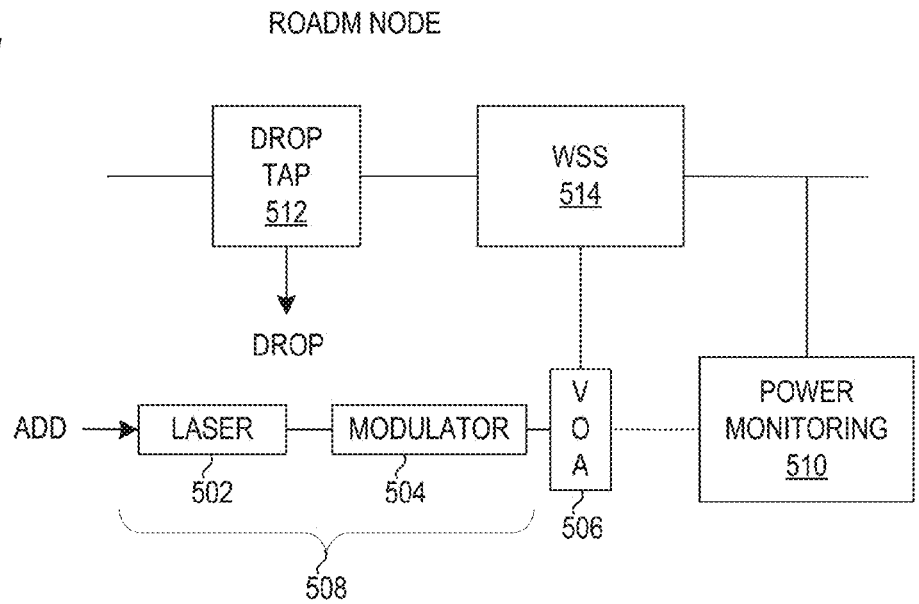

Referring to FIG. 5B, selected elements of an embodiment of a ROADM node 110-2 is shown in further detail. As shown in FIG. 5B, ROADM node 110-2 includes drop tap 512 for removing dropped subcarriers from the arriving superchannel. Drop tap 512 may remove zero to n number of subcarriers, where the superchannel transmits n number of subcarriers. ROADM node 110-2 also includes WSS 514 for combining added subcarriers to the output superchannel. WSS 514 may add zero to any number of subcarriers to the superchannel. In this manner, ROADM node 110-2 may enable various topologies and inter-connections of optical networks and optical network segments, as described previously. Also included with ROADM node 110-2 is transmitter 508, which may be substantially similar to transmitter 408 shown in FIGS. 4A-C, for transmitting an added subcarrier. Specifically, transmitter 508 is shown including laser 502 and modulator 504, as described previously. Also included with ROADM node 110-2 is VOA 506, which is substantially similar to VOA 406 in FIG. 4A. Although transmitter 508 and VOA 506 are shown as a singular unit, it will be understood that any number of subcarriers may be added by WSS 514, with each added subcarrier having a respective instance of transmitter 508 and VOA 506. Also included with ROADM node 110-2 is power monitoring 510, which may represent substantially similar functionality as power monitoring 410 described in FIGS. 4A-C. As shown in FIG. 5B, power monitoring 510 provides control in the form of electrical signals to VOA 506 to set each added subcarrier power pre-emphasis value by attenuation, when applicable.

Figure 5C:
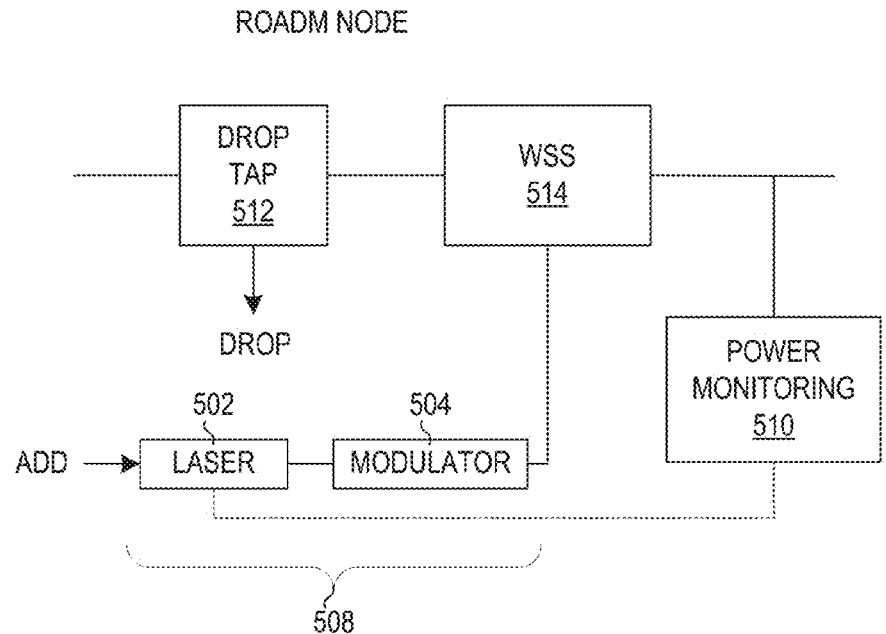

Referring to FIG. 5C, selected elements of an embodiment of a ROADM node 110-3 is shown in further detail. As shown in FIG. 5C, ROADM node 110-3 includes drop tap 512 for removing dropped subcarriers from the arriving superchannel. Drop tap 512 may remove zero to n number of subcarriers, where the superchannel transmits n number of subcarriers. ROADM node 110-3 also includes WSS 514 for combining added subcarriers to the output superchannel. WSS 514 may add zero to any number of subcarriers to the superchannel. In this manner, ROADM node 110-3 may enable various topologies and inter-connections of optical networks and optical network segments, as described previously. Also included with ROADM node 110-3 is transmitter 508, which may be substantially similar to transmitter 408 shown in FIGS. 4A-C, for transmitting an added subcarrier. Specifically, transmitter 508 is shown including laser 502 and modulator 504, as described previously. Although transmitter 508 is shown as a singular unit, it will be understood that any number of subcarriers may be added by WSS 514, with each added subcarrier having a respective instance of transmitter 508. Also included with ROADM node 110-3 is power monitoring 510, which may represent substantially similar functionality as power monitoring 410 described in FIGS. 4A-C. As shown in FIG. 5C, power monitoring 510 provides control in the form of electrical signals to laser 502 to set each added subcarrier power pre-emphasis value by reduction in laser output power, when applicable.

Figure 6:
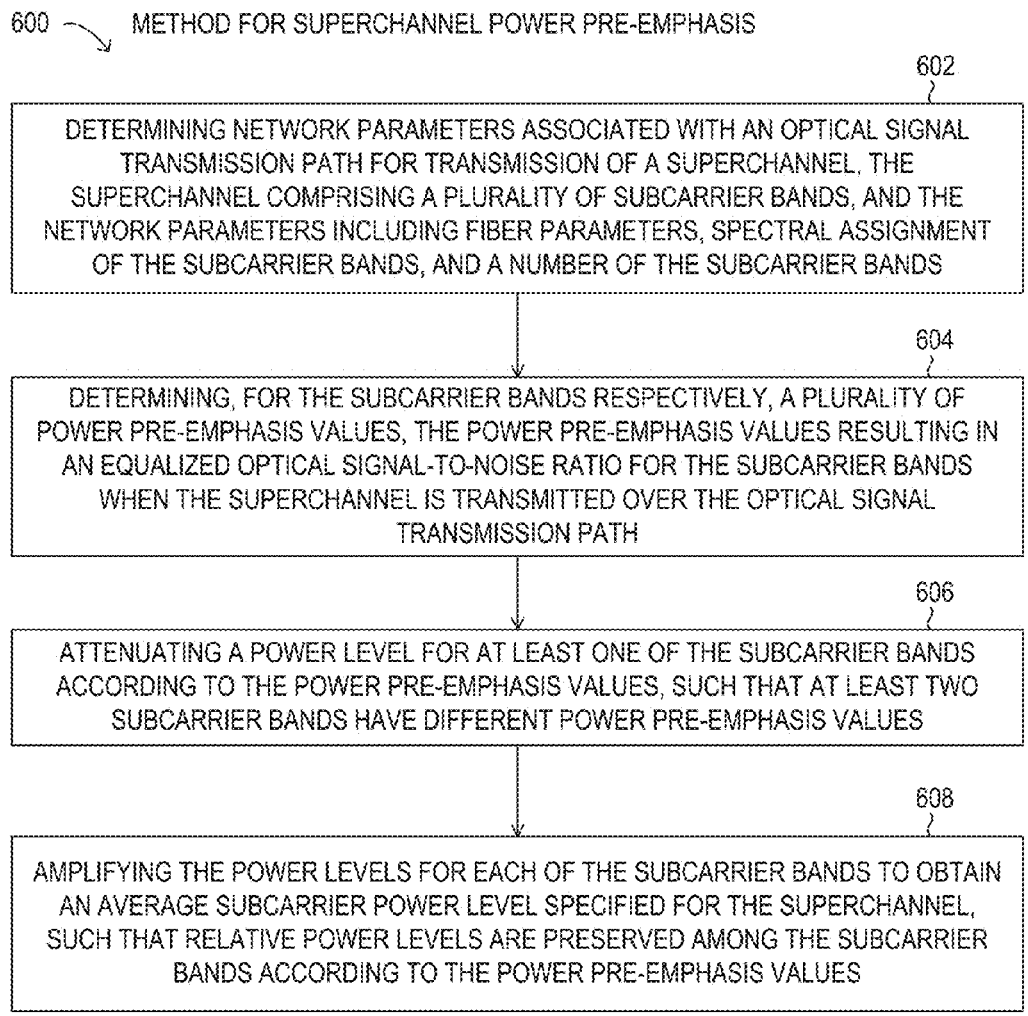
FIG. 6 is a flow chart of selected elements of an embodiment of a method for superchannel power pre-emphasis.

Referring now to FIG. 6, method 600 for superchannel power pre-emphasis is shown in flow chart form. As shown method 600 may be performed using optical transport network 101 (see FIG. 1) in conjunction with optical control plane system 700 (see FIG. 7). It is noted that operations described with respect to method 600 may be omitted or rearranged in different embodiments.

Method 600 may begin by determining (operation 602) network parameters associated with an optical signal transmission path for transmission of a superchannel, the superchannel comprising a plurality of subcarrier bands, and the network parameters including fiber parameters, spectral assignment of the subcarrier bands, and a number of the subcarrier bands. The network parameters may be determined in operation 602 by optical control plane system 700, which may be in communication with nodes illustrated in optical transport network 101. Then, a plurality of power pre-emphasis values may be determined (operation 604), for the subcarrier bands respectively, the power pre-emphasis values resulting in an equalized optical signal-to-noise ratio for the subcarrier bands when the superchannel is transmitted over the optical signal transmission path. A power level for at least one of the subcarrier bands may be attenuated (operation 606) according to the power pre-emphasis values, such that at least two subcarrier bands have different power pre-emphasis values. Finally, the power levels for each of the subcarrier bands may be amplified (operation 608) to obtain an average subcarrier power level specified for the superchannel, such that relative power levels are preserved among the subcarrier bands according to the power pre-emphasis values.

Figure 7:
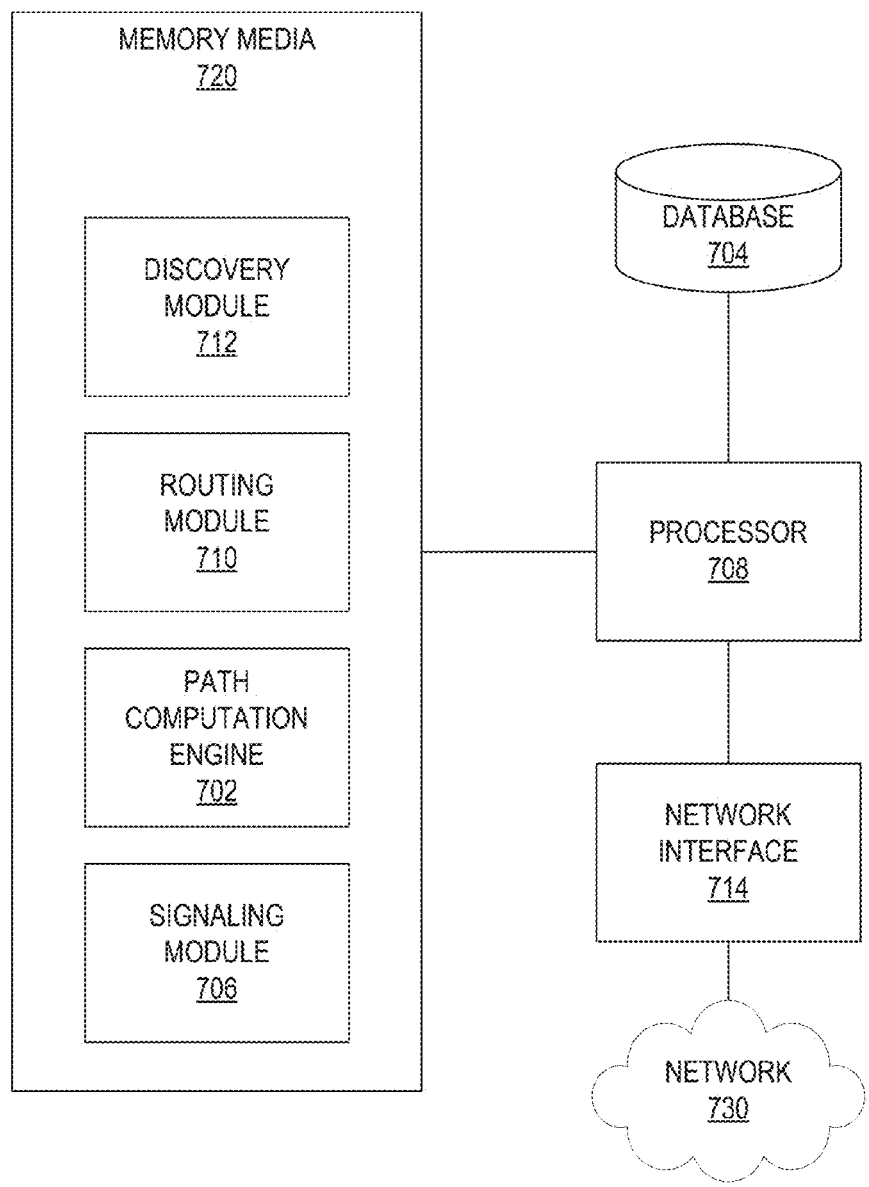
FIG. 7 is a block diagram of selected elements of an embodiment of an optical control plane system for superchannel power pre-emphasis.

Referring now to FIG. 7, a block diagram of selected elements of an embodiment of control system 700 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 700 may work together to automatically establish services within the optical network. Discovery module 712 may discover local links connecting to neighbors. Routing module 710 may broadcast local link information to optical network nodes while populating database 704. When a request for service from the optical network is received, path computation engine 702 may be called to compute a network path using database 704. This network path may then be provided to signaling module 706 to establish the requested service.

As shown in FIG. 7, control system 700 includes processor 708 and memory media 720, which may store executable instructions (i.e., executable code) that may be executable by processor 708, which has access to memory media 720. Processor 708 may execute instructions that cause control system 700 to perform the functions and operations described herein. For the purposes of this disclosure, memory media 720 may include non-transitory computer-readable media that stores data and instructions for at least a period of time. Memory media 720 may comprise persistent and volatile media, fixed and removable media, and magnetic and semiconductor media. Memory media 720 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 720 is operable to store instructions, data, or both. Memory media 720 as shown includes sets or sequences of instructions that may represent executable computer programs, namely, path computation engine 702, signaling module 706, discovery module 712, and routing module 710.

Also shown included with control system 700 in FIG. 7 is network interface 714, which may be a suitable system, apparatus, or device operable to serve as an interface between processor 708 and network 730. Network interface 714 may enable control system 700 to communicate over network 730 using a suitable transmission protocol or standard. In some embodiments, network interface 714 may be communicatively coupled via network 730 to a network storage resource. In some embodiments, network 730 represents at least certain portions of optical transport network 101. Network 730 may also include certain portions of a network using galvanic or electronic media. In certain embodiments, network 730 may include at least certain portions of a public network, such as the Internet. Network 730 may be implemented using hardware, software, or various combinations thereof.

In certain embodiments, control system 700 may interface with a person (a user) and receive data about the optical signal transmission path. For example, control system 700 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 700 may receive data about the optical signal transmission path from a device such as another computing device or a network element, for example via network 730.

As shown in FIG. 7, in some embodiments, discovery module 712 may receive data concerning an optical signal transmission path in an optical network and may be responsible for discovery of neighbors and links between neighbors. In other words, discovery module 712 may send discovery messages according to a discovery protocol, and may receive data about the optical signal transmission path. In some embodiments, discovery module 712 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 7, routing module 710 may be responsible for propagating link connectivity information to various nodes within an optical network, such as optical transport network 101. In particular embodiments, routing module 710 may populate database 704 with resource information to support traffic engineering, which may include link bandwidth availability. Accordingly, database 704 may be populated by routing module 710 with information usable to determine a network topology of an optical network.

Path computation engine 702 may use the information provided by routing module 710 to database 704 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 702 may consider the interplay between the transmission degradation factors. In various embodiments, path computation engine 702 may generate values for specific transmission degradation factors. Path computation engine 702 may further store data describing the optical signal transmission path in database 704.

In some embodiments, path computation engine 702 may provide the accumulated amount of each transmission degradation factor for the optical signal transmission path. Alternately or additionally, path computation engine 702 may provide the OSNR penalty due to each transmission degradation factor. Alternately or additionally, path computation engine 702 may provide the OSNR penalty due to a combination of one or more transmission degradation factors. Alternately or additionally, path computation engine 702 may provide the total OSNR of the optical signal transmission path. The total OSNR may be the optimal OSNR that may be achieved along the optical signal transmission path without any degradation. Alternatively or additionally, path computation engine 702 may determine OSNR degradation along the optical signal transmission path, for example, when OSNR degradation is due to non-linear intra subcarrier interactions. In some embodiments, path computation engine 702 may provide additional information regarding the optical signal transmission path.

In FIG. 7, signaling module 706 may provide functionality associated with setting up, modifying, and tearing down end-to-end networks services in an optical network, such as optical transport network 101. For example, when an ingress node in the optical network receives a service request, control system 100 may employ signaling module 706 to request a network path from path computation engine 702 that may be optimized according to different criteria, such as bandwidth, cost, etc. When the desired network path is identified, signaling module 706 may then communicate with respective nodes along the network path to establish the requested network services. In different embodiments, signaling module 706 may employ a signaling protocol to propagate subsequent communication to and from nodes along the network path.

In operation of control system 700, for example, when power pre-emphasis, as described herein, is performed with feedback control, discovery module 712 may receive power levels from receiver 112 for each subcarrier. When power pre-emphasis, as described herein, is performed using feedforward or feedback control, discovery module 712 may receive power levels from power monitoring 410, 510 for each subcarrier transmitted in a superchannel.

Database 704 may store the data produced by path computation engine 702 about the optical signal transmission path. Processor 708 may execute computer instructions that cause the system 700 to perform the functions and operations described herein for power pre-emphasis of superchannel subcarriers. The computer instructions may be loaded into the memory 710 for execution by processor 708, while data generated, received, or operated on during performance of the functions and operations described herein may be stored in memory 710, at least temporarily.

As disclosed herein, methods and systems for superchannel power pre-emphasis may adjust power levels of selected subcarriers of the superchannel. The power pre-emphasis may be performed at a transmission stage using a laser source, a variable optical attenuator, or a wavelength selective switch. The power pre-emphasis may be performed in-line at a reconfigurable optical add-drop multiplexer node. The power pre-emphasis may be performed using feedback control based on a receiver output. The power pre-emphasis may be performed using feedforward control based on optical path computations.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for power pre-emphasis for subcarriers of a superchannel, the method comprising:
   determining network parameters associated with an optical signal transmission path for transmission of a superchannel, wherein the superchannel comprises a plurality of subcarrier bands, and wherein the network parameters include fiber parameters, spectral assignment of the subcarrier bands, and a number of the subcarrier bands;
   determining, for the subcarrier bands respectively, a plurality of power pre-emphasis values, the power pre-emphasis values resulting in an equalized optical signal-to-noise ratio for the subcarrier bands when the superchannel is transmitted over the optical signal transmission path; and
   attenuating a power level for at least one of the subcarrier bands located in an edge band of the superchannel according to the power pre-emphasis values to lower the transmission power level of the at least one of the subcarrier bands, wherein at least two subcarrier bands have different power pre-emphasis values.

2. The method of claim 1, wherein the attenuating the power level comprises controlling a variable optical attenuator associated with an optical transmitter for a subcarrier band.

3. The method of claim 2, wherein the variable optical attenuator outputs an optical signal to a wavelength selective switch.

4. The method of claim 1, wherein the attenuating the power level comprises controlling a laser source included with an optical transmitter for a subcarrier band.

5. The method of claim 4, wherein the optical transmitter outputs an optical signal to a wavelength selective switch.

6. The method of claim 1, wherein the attenuating the power level comprises sending an indication to a wavelength selective switch of a first power pre-emphasis value corresponding to a first subcarrier band.

7. The method of claim 6, wherein the wavelength selective switch is included in a reconfigurable optical add-drop multiplexer node in the optical signal transmission path, and wherein the first subcarrier band is added to the superchannel at the reconfigurable optical add-drop multiplexer node.

8. The method of claim 7, wherein the reconfigurable optical add-drop multiplexer node drops a second subcarrier band from the superchannel.

9. The method of claim 1, further comprising:
   subsequent to attenuating the power level, amplifying the power levels for each of the subcarrier bands to obtain an average subcarrier power level specified for the superchannel, wherein relative power levels are preserved among the subcarrier bands according to the power pre-emphasis values.

10. The method of claim 1, further comprising:
    monitoring power levels of the subcarrier bands in the superchannel, wherein the attenuating the power level is based on the power levels monitored.

11. An optical transport network enabled for power pre-emphasis for subcarriers of a superchannel, the optical transport network comprising:
    a control plane system including a processor configured to access non-transitory computer readable memory media, wherein the memory media store processor-executable instructions, the instructions, when executed by the processor, cause the processor to:
    determine network parameters associated with an optical signal transmission path for transmission of the superchannel, wherein the superchannel comprises a plurality of subcarrier bands, and wherein the network parameters include fiber parameters, spectral assignment the subcarrier bands, and a number of the subcarrier bands;
    determine, for the subcarrier bands respectively, a plurality of power pre-emphasis values, the power pre-emphasis values resulting in an equalized optical signal-to-noise ratio for the subcarrier bands when the superchannel is transmitted over the optical signal transmission path; and
    send a first command to at least one node in the optical transport network to attenuate a power level for at least one of the subcarrier bands located in an edge band of the superchannel according to the power pre-emphasis values to lower the transmission power level of the at least one of the subcarrier bands, wherein at least two subcarrier bands have different power pre-emphasis values.

12. The optical transport network of claim 11, wherein the instructions to send the first command include instructions to send the first command to a variable optical attenuator associated with an optical transmitter for a subcarrier band.

13. The optical transport network of claim 12, wherein the variable optical attenuator outputs an optical signal to a wavelength selective switch.

14. The optical transport network of claim 11, wherein the instructions to send the first command include instructions to send the first command to a laser source included with an optical transmitter for a subcarrier band.

15. The optical transport network of claim 14, wherein the optical transmitter outputs an optical signal to a wavelength selective switch.

16. The optical transport network of claim 11, wherein the instructions to send the first command include instructions to send an indication to a wavelength selective switch of a first power pre-emphasis value for a first subcarrier band.

17. The optical transport network of claim 16, wherein the wavelength selective switch is included in a reconfigurable optical add-drop multiplexer node in the optical signal transmission path, and wherein the first subcarrier band is added to the superchannel at the reconfigurable optical add-drop multiplexer node.

18. The optical transport network of claim 17, wherein the reconfigurable optical add-drop multiplexer node drops a second subcarrier band from the superchannel.

19. The optical transport network of claim 11, further comprising instructions to:
subsequent to executing the instructions to attenuate the power level, send a second command to at least one in-line amplifier to amplify the power levels for each of the subcarrier bands to obtain an average subcarrier power level specified for the superchannel, wherein relative power levels are preserved among the subcarrier bands according to the power pre-emphasis values.

20. The optical transport network of claim 11, further comprising:
a power monitor to monitor power levels of the subcarrier bands in the superchannel, wherein the instructions to attenuate the power level are based on the power levels monitored by the power monitor.

* * * * *